UNITED STATES PATENT OFFICE.

WILLIAM BRADLEY, OF ST. LOUIS, MISSOURI.

CATARRH REMEDY.

SPECIFICATION forming part of Letters Patent No. 440,461, dated November 11, 1890.

Application filed August 21, 1890. Serial No. 362,673. (No specimens.)

*To all whom it may concern:*

Be it known that I, WILLIAM BRADLEY, of St. Louis, Missouri, have made a new and useful Improvement in Medicinal Compounds, of which the following is a full, clear, and exact description.

My improvement is designed especially for the cure of catarrh. It is composed as follows: Of extract of licorice-root take one-fourth of an ounce, of cane or similar sugar take one and three-fourths of an ounce, of rock-salt brine take five ounces, all troy weight. The brine is formed by dissolving one and one-half ounces of the salt in five ounces of water, and the compound is formed by adding the licorice-extract and the sugar to the brine. I desire not to be restricted to a brine of the strength named; but I consider it the best. Nor do I wish in the use of the other ingredients specified to be confined to the exact proportions given in the formula, and the licorice-extract might even be omitted and good results obtained. It is better, however, to combine the three ingredients, and I have given in each instance the most useful amount. The licorice-extract increases the healing influence of the medicine, and the sugar is practically essential, as with the brine only a cure cannot well, even in a measure, be accomplished; but to prepare my improved catarrh medicine another ingredient, milk, must be added. Of the compound thus far described I take one part, by measure, and of fresh milk three parts and thoroughly mix them.

The medicine is used by applying it as a wash to the nasal passages.

I claim—

A catarrh medicine combining in it sugar, brine, and milk, substantially as described.

Witness my hand this 13th day of August, 1890.

WILLIAM BRADLEY.

Witnesses:
C. D. MOODY,
C. C. LOGAN.